US012333487B2

(12) United States Patent
Vaught et al.

(10) Patent No.: US 12,333,487 B2
(45) Date of Patent: Jun. 17, 2025

(54) IN-SCOPE AND OUT-OF-SCOPE RFID-BASED ITEM MANAGEMENT

(71) Applicant: Walmart Apollo, LLC, Bentonville, AR (US)

(72) Inventors: Sara Vaught, Centerton, AR (US); Jeffrey S. Cruz, Bentonville, AR (US); Donald Busse, Bentonville, AR (US); Mike Graen, Fayetteville, AR (US); Abiy Hailemichael, Sterling, VA (US)

(73) Assignee: Walmart Apollo, LLC, Bentonville, AR (US)

( * ) Notice: Subject to any disclaimer, the term of this patent is extended or adjusted under 35 U.S.C. 154(b) by 506 days.

(21) Appl. No.: 17/708,218

(22) Filed: Mar. 30, 2022

(65) Prior Publication Data

US 2022/0318732 A1 Oct. 6, 2022

Related U.S. Application Data

(60) Provisional application No. 63/168,413, filed on Mar. 31, 2021.

(51) Int. Cl.
*G06Q 10/087* (2023.01)
*G06K 7/10* (2006.01)

(52) U.S. Cl.
CPC ....... *G06Q 10/087* (2013.01); *G06K 7/10366* (2013.01)

(58) Field of Classification Search
CPC .......... G06Q 10/087; G06K 7/10366
See application file for complete search history.

(56) References Cited

U.S. PATENT DOCUMENTS

| 8,321,302 B2 | 11/2012 | Bauer et al. |
| 8,321,303 B1 | 11/2012 | Krishnamurthy et al. |
| 9,773,092 B2 | 9/2017 | Olson et al. |
| 2012/0166241 A1 | 6/2012 | Livingston et al. |
| 2018/0189760 A1* | 7/2018 | Brooks ................. G06N 20/00 |

OTHER PUBLICATIONS

Kang, Y. K. (2004). Information inaccuracy in inventory systems (Doctoral dissertation, Massachusetts Institute of Technology) (Year: 2004).*

* cited by examiner

*Primary Examiner* — Florian M Zeender
*Assistant Examiner* — Kimberly S. Bursum
(74) *Attorney, Agent, or Firm* — Foley IP Law, PLLC

(57) ABSTRACT

Examples provide a system for managing inventory updates based on RFID data using product in-scope and out-of-scope rules (PISOS). The PISOS system adjusts on-hand inventory count values for an item upward based on item scan data if the scan data identifies a higher number of instances of a given item than is recorded in on-hand inventory. The PISOS system does not permit adjusting on-hand inventory downward based on the scan data indicating fewer instances of the given item within an item display area than is recorded in on-hand inventory unless a set of PISOS rules indicate the given item is in-scope for downward adjustments. If the item is out-of-scope, no downward adjustments to on-hand inventory are made based on the number of items detected during the scan.

17 Claims, 11 Drawing Sheets

SET OF PISOS RULES 600

RFID ELIGIBLE RULE 602

PISOS INDICATOR RULE 604

DEFAULT DOWNWARD ADJUSTMENT RULE 606

DEFAULT UPWARD ADJUSTMENT RULE 608

FEATURE RULE 610

GUARD RAIL RULE 612

VERIFICATION RULE 614

*FIG. 6*

IN-SCOPE AND OUT-OF-SCOPE RFID-BASED ITEM MANAGEMENT

BACKGROUND

Radio frequency identification (RFID) tags are frequently attached to products or printed directly on the product for use in tracking the locations of items and/or identifying items within a retail environment or storage facility. RFID tag data can be used to manually update item counts in inventory. However, not all items have RFID tags at all times. Some RFID tags are detachable and may be removed or fall off some products. Other RFID tags may malfunction or become damaged, such that they are no longer functional. Other items may be unsuitable for RFID tagging due to packaging constraints, materials used in the product or other factors. Moreover, RFID scans which are performed inaccurately or incompletely can result in incorrect changes to inventory data based on inaccurate and/or incomplete RFID tag data. These inaccurate inventory records frequently result in replenishment problems, product overstock, product understock, item outs, insufficient storage space for overstock items, as well as other inventory-related problems.

SUMMARY

Some examples provide a product in-scope out-of-scope (PISOS) system including at least one RFID tag reader gathering RFID tag data from a plurality of RFID tags associated with a plurality of items within an item display area. The system adjusts current on-hand inventory count values associated with a first set of items in the plurality of items upward based on detected item count values generated using the RFID tag data on condition the detected item count values associated with the first set of items exceeds current on-hand inventory count values associated with the first set of items. A rules engine applies a set of PISOS rules to a second set of items having detected item count values lower than the current on-hand inventory count values. Downward adjustment of the current on-hand inventory count values associated with an item in the second set of items is allowed if the item is in-scope for downward adjustment. The downward adjustment for the item is not permitted if the item is out-of-scope for downward adjustment. Downward adjustment of the current on- hand inventory count values for a first sub-set of items within the second set of items identified as out-of-scope is rejected. The system sends the detected item count values associated with a second sub-set of items from the second set of items to an inventory system. A second sub-set of items in the second set of items is in-scope for downward adjustment. The detected item count values are used to adjust the current on-hand inventory count values associated with the second sub-set of items downward.

Other examples provide a computer-implemented method for controlling automatic on-hand inventory updates based on RFID tag data obtained from a plurality of RFID tagged items within a retail environment. Upward adjustment of current on-hand inventory count values associated with a first set of items in the plurality of items using detected item count values generated based on analysis of RFID tag data is permitted if the detected item count values exceed the current on-hand inventory count values for the first set of items. A set of PISOS rules are applied to a second set of items. The detected item count values for the second set of items are less than the current on-hand inventory count for the second set of items. The set of PISOS rules are applied to determine whether the second set of items are in-scope for downward inventory adjustment. A first sub-set of items within the second set of items are identified as out-of-scope. A second sub-set of items are identified as in-scope based on application of the PISOS rules. The downward adjustment of the current on-hand inventory count values are rejected for the first sub-set of items. The downward adjustment is permitted for the second sub-set of items. The detected item count values associated with the second sub-set of items are provided to an inventory system for inventory adjustment.

Still other examples provide one or more computer storage devices having computer-executable instructions stored thereon, which, on execution by a computer, cause the computer to perform operations including permitting upward adjustment of current on-hand inventory count values associated with a first set of items in the plurality of items using detected item count values generated based on analysis of RFID tag data on condition the detected item count values associated with the first set of items exceeds current on-hand inventory count values associated with the first set of items. A set of product in-scope out-of-scope (PISOS) rules are applied to a second set of items having detected item count values lower than the current on-hand inventory count values. The current on-hand inventory count values for a first sub-set of items within the second set of items identified as out-of-scope are maintained. The detected item count values associated with a second sub-set of items from the second set of items are transmitted to an inventory system for downward adjustment of the current on-hand inventory count values associated with the second sub-set of items in response to identification of the second sub-set of items as in-scope for the downward adjustment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 6 is an exemplary block diagram illustrating a set of PISOS rules.

Corresponding reference characters indicate corresponding parts throughout the drawings.

DETAILED DESCRIPTION

Figure 1:
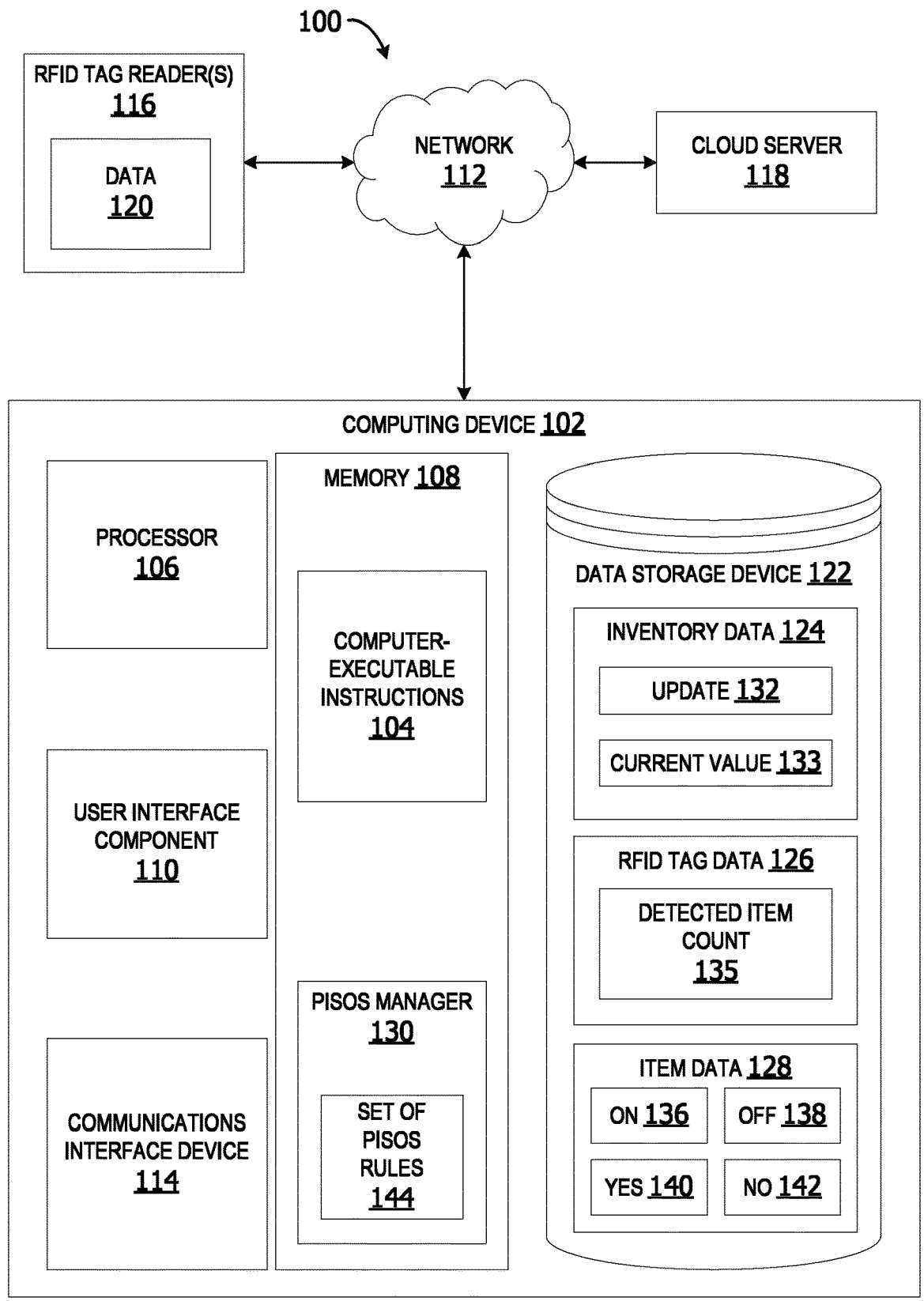
FIG. 1 is an exemplary block diagram illustrating a system for product in-scope out-of-scope (PISOS) management of inventory updates using RFID tag data.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

Problems associated with utilization of RFID tags can result in errant low inventory signals. One problem occurs when one hundred percent of all items in a group of items being scanned are not RFID tagged, meaning some of the inventory on hand is tagged, and some is not. This results in partial or incomplete inventory updating through an RFID scan due to RFID tag data showing less inventory than is actually present on a sales floor, storage area or other location in which RFID tagged items are being scanned. The same result occurs if some of the products are improperly encoded within RFID tag data, such that the system mis-identifies tagged items. Additionally, if the RFID tags are damaged or destroyed, the same false inventory signal is generated. This partial accounting of the full complement of product may result in an improper action taking place, such as automatically triggering a replenishment order, resulting in item overstock.

Referring to the figures, examples of the disclosure enable a product in-scope and out-of-scope (PISOS) RFID based inventory update management. In some examples, the PISOS manager enables upward adjustment of on-hand inventory based on scan data, such as, but not limited to, RFID tag data. This enables on-hand inventory to be corrected to reflect the actual number of items detected during a scan. If on-hand inventory shows eight instances of an item and RFID scans detect nine instances of the item, it is unlikely that detected number is incorrect. An item which has been scanned is most likely actually present. Therefore, adjusting inventory upward for all items improves reliability and accuracy of on-hand inventory.

In other examples, the PISOS manager does not permit downward adjustment of on-hand inventory if a scan detects fewer instances of a given item than is recorded in inventory data. A scan can fail to detect items which actually are present in on-hand inventory due to missing or damaged RFID tags. Moreover, an incomplete or incorrectly performed scan may fail to scan all items available for scanning. Changing on-hand inventory numbers to a lower count value based on scan data can lead to errors. Therefore, the default rule preventing downward adjustment of inventory count values reduces errors and improves reliability of on-hand inventory.

In yet other examples, a set of PISOS rules are applied to determine if the inventory count values for a given item should be adjusted downward. The set of rules determines whether a scan is complete, an item is located in accessible area(s) and whether the detected count value satisfies a store-item confidence level before permitting adjustment of the inventory count values. This ensures more accurate and reliable inventory data while reducing errors due to incomplete scans.

In some examples, the PISOS component determines whether to adjust inventory based on RFID tag data obtained during one or more RFID tag scans. The system turns auto-correction of inventory on or off based on certain signals using a series of rules that determine confidence level in the RFID tag data received. The rules determine a confidence level that all items expected to be tagged are still tagged and detected. The decision whether to permit the auto-adjustment of on hand inventory values is made by the PISOS component based on the confidence that all items are tagged based on the store-item confidence level. This PISOS rule application is turned on/off on a store-item specific basis. This enables more accurate automatic updating of inventory based on RFID tag data while reducing inventory errors due to failure to obtain RFID tag data from all items expected to be RFID tagged by the system.

The computing device including the PISOS manager operates in an unconventional manner by applying rules-based analysis to received RFID based item data prior to permitting automatic update of inventory numbers for RFID tagged items. In this manner, the computing device is used in an unconventional way, and allows more accurate automatic inventory updates while reducing the error rate in inventory updates, thereby improving the functioning of the underlying computing device.

Referring now to FIG. 1, an exemplary block diagram illustrates a system 100 for product in-scope out-of-scope (PISOS) management of inventory updates using RFID tag data. In the example of FIG. 1, the computing device 102 represents any device executing computer-executable instructions 104 (e.g., as application programs, operating system functionality, or both) to implement the operations and functionality associated with the computing device 102. The computing device 102 in some examples includes a mobile computing device or any other portable device. A mobile computing device includes, for example but without limitation, a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In some examples, the computing device 102 has at least one processor 106 and a memory 108. The computing device 102 in other examples includes a user interface device 110.

The processor 106 includes any quantity of processing units and is programmed to execute the computer-executable instructions 104. The computer-executable instructions 104 is performed by the processor 106, performed by multiple processors within the computing device 102 or performed by a processor external to the computing device 102. In some examples, the processor 106 is programmed to execute instructions such as those illustrated in the figures (e.g., FIG. 9, FIG. 10, and FIG. 11).

The computing device 102 further has one or more computer-readable media such as the memory 108. The memory 108 includes any quantity of media associated with or accessible by the computing device 102. The memory 108 in these examples is internal to the computing device 102 (as shown in FIG. 1). In other examples, the memory 108 is external to the computing device (not shown) or both (not shown). The memory 108 can include read-only memory and/or memory wired into an analog computing device.

The memory 108 stores data, such as one or more applications. The applications, when executed by the processor 106, operate to perform functionality on the computing device 102. The applications can communicate with counterpart applications or services such as web services accessible via a network 112. In an example, the applications represent downloaded client-side applications that correspond to server-side services executing in a cloud.

In other examples, the user interface device 110 includes a graphics card for displaying data to the user and receiving data from the user. The user interface device 110 can also include computer-executable instructions (e.g., a driver) for operating the graphics card. Further, the user interface device 110 can include a display (e.g., a touch screen display or natural user interface) and/or computer-executable instructions (e.g., a driver) for operating the display. The user interface device 110 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the computing device 102 in one or more ways.

The network 112 is implemented by one or more physical network components, such as, but without limitation, routers, switches, network interface cards (NICs), and other network devices. The network 112 is any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

In some examples, the system 100 optionally includes a communications interface component 114. The communications interface component 114 includes a network interface card and/or computer-executable instructions (e.g., a driver) for operating the network interface card. Communication between the computing device 102 and other devices, such as but not limited to one or more RFID tag reader(s) 116 and/or a cloud server 118, can occur using any protocol or mechanism over any wired or wireless connection. In some examples, the communications interface component 114 is operable with short range communication technologies such as by using near-field communication (NFC) tags.

The RFID tag reader(s) 116 includes one or more devices for gathering or obtaining RFID tag data 120 from one or more RFID tags attached to one or more items within a retail environment. An RFID tag can be physically attached to an item or item packaging. In other examples, an RFID tag can be printed directly onto the item. The RFID tag reader(s) 116 can include a hand-held reader, such as a hand-held scanning device or wand. In other examples, the RFID tag reader(s) 116 can include one or more fixed (immovable) reader device, attached to a shelf, ceiling, rack, wall, pole, support, or other fixture.

In some examples, the RFID tag reader is a hand-held device or a device incorporated into a mobile user device operated by a human user. In other examples, the RFID tag reader is attached to or otherwise incorporated into a robotic device. The robotic device can include a device that moves along the ground or an aerial drone device. The robotic device moves through the scan zone using auto-navigation systems. The robotic device autonomously gathers RFID tag data from RFID tags within the scan range of the RFID tag reader(s) attached to, held by or otherwise incorporated within the robotic device. In still other devices, the RFID tag reader is mounted or attached in a fixed position. In these examples, the RFID tag reader can be attached to a ceiling, post, display, wall or any other fixture. The mounted/fixed location RFID tag reader gathers RFID tag data from any RFID tags within the scan zone/detection range of the fixed RFID tag reader.

The cloud server 118 is a logical server providing services to the computing device 102 or other clients, such as, but not limited to, a user device. The cloud server 118 is hosted and/or delivered via the network 112. In some non-limiting examples, the cloud server 118 is associated with one or more physical servers in one or more data centers. In other examples, the cloud server 118 is associated with a distributed network of servers.

The system 100 can optionally include a data storage device 122 for storing data, such as, but not limited to inventory data 124, RFID tag data 126, and/or item data 128. The inventory data 124 is data associated with on-hand inventory data for one or more instances of items in inventory. The inventory data 124 can include current inventory count values, such as, but not limited to, a current value 133. The current value 133 is the system inventory indicating the number of instances of one or more items or types of items currently on-hand within a store, warehouse, distribution center, item fulfillment center or other retail environment.

The examples are not limited to a retail environment. In other examples, the system may be utilized within a park, garden, wild-life preserve, indoors, outdoors, or any other space including tagged elements. A tagged element can include an animal, plant or inanimate item having an RFID tag associated with it. An RFID tag is associated with an element if it is removably attached to the element, printed on the element, attached to packaging at least partially enclosing the element, attached to a tag on the element, or otherwise associated with the element.

The inventory data 124 can receive an update 132. The update 132 is a change or modification to the current value 133. The update 132 can be an upward adjustment increasing the on-hand inventory count values for a given item. The update 132 can also be a downward adjustment to decrease the on-hand inventory count values for a given item.

RFID tag data 126 is data received from one or more RFID tag readers, such as, but not limited to, the RFID tag reader(s) 116. The data 120 received from the RFID tag reader(s) 116 is stored in the data storage device 122 as the RFID tag data 126. The RFID tag data 126 is optionally analyzed by a PISOS manager 130 to identify a detected item count 135. The detected item count 135 is the number of instances of an item or type of item detected via the RFID scans performed by the RFID tag reader(s) 116.

However, the example are not limited to the PISOS manager determining the detected item count 135. In other examples, the data 120 and/or the RFID tag data 126 is transferred to the cloud server 118 or another computing device for analysis. The cloud server 118 performs the analysis of the RFID tag data and calculates the detected item count 135. The detected item count is then transmitted to the PISOS manager 130.

The item data 128 is data associated with each item or type of item. The item data 128, in some examples, includes indicator(s) 134. The indicator(s) 134, in some examples, includes a PISOS indicator. The PISOS indicator indicates whether an item is eligible for downward adjustment of on-hand inventory current value 133 based on RFID tag data, such as the data 120 and/or the RFID tag data 126. If the PISOS indicator is set of "on" 136, the item is qualified to have its current on-hand inventory count value decreased automatically based on RFID tag data. If the PISOS indicator is set of "off" 138, the item's on-hand inventory count value cannot be lowered using RFID tag data. Instead, the default rule applies which states that on-hand inventory is never adjusted downward for RFID tagged items unless the item qualifies for downward adjustment in accordance with the set of PISOS rules The indicator(s) 134, can include an RFID eligibility indicator. The RFID eligibility indicator indicates whether an item or type of item is RFID tagged. An item is RFID tagged if the item has an RFID tag attached to it or printed on it. The RFID indicator can be set to "yes" 140 indicating the item is RFID eligible or "no" 142 indicating the item is not RFID eligible (no RFID tag attached).

The data storage device 122 can include one or more different types of data storage devices, such as, for example, one or more rotating disks drives, one or more solid state drives (SSDs), and/or any other type of data storage device. The data storage device 122 in some non-limiting examples includes a redundant array of independent disks (RAID) array. In other examples, the data storage device 122 includes a database.

The data storage device 122 in this example is included within the computing device 102, attached to the computing device, plugged into the computing device, or otherwise associated with the computing device 102. In other examples, the data storage device 122 includes a remote data storage accessed by the computing device via the network 112, such as a remote data storage device, a data storage in a remote data center, or a cloud storage.

The memory 108, in some examples, stores one or more computer-executable components, such as, but not limited to, the PISOS manager 130. The PISOS manager component, when executed by the processor 106 of the computing device 102, performs a upward adjustment on current on-hand inventory count values associated with a first set of items in the plurality of items within the retail environment based on the detected item count 135 values generated using RFID tag data 126 when the detected item count 135 values associated with the first set of items exceeds current value 133 of the on-hand inventory associated with the first set of items. The PISOS manager 130 applies the PISOS rules 144 to a second set of items having detected item count 135 values lower than the current on-hand inventory count values. The downward adjustment of the current on-hand inventory count values 133 associated with an item in the second set of items is allowed on condition application of the set of PISOS rules indicates the item is in-scope for downward adjustment. The downward adjustment for the item is rejected if the set of PISOS rules indicates the item is out-of-scope for downward adjustment.

In other examples, the PISOS manager 130 rejects or otherwise prevents the downward adjustment of the current on-hand inventory count values for a first sub-set of items within the second set of items identified as out-of-scope. The downward adjustment is prevented by not passing the RFID tag data and/or the detected item count 135 values to the inventory system responsible for updating the inventory data 124.

A second sub-set of items within the second set of items is in-scope for downward adjustment of the current on-hand inventory count values. The PISOS manager 130 sends the detected item count values associated with the second sub-set of items to an inventory system for downward adjustment of the current on-hand inventory count values of the second sub-set of items.

Figure 2:
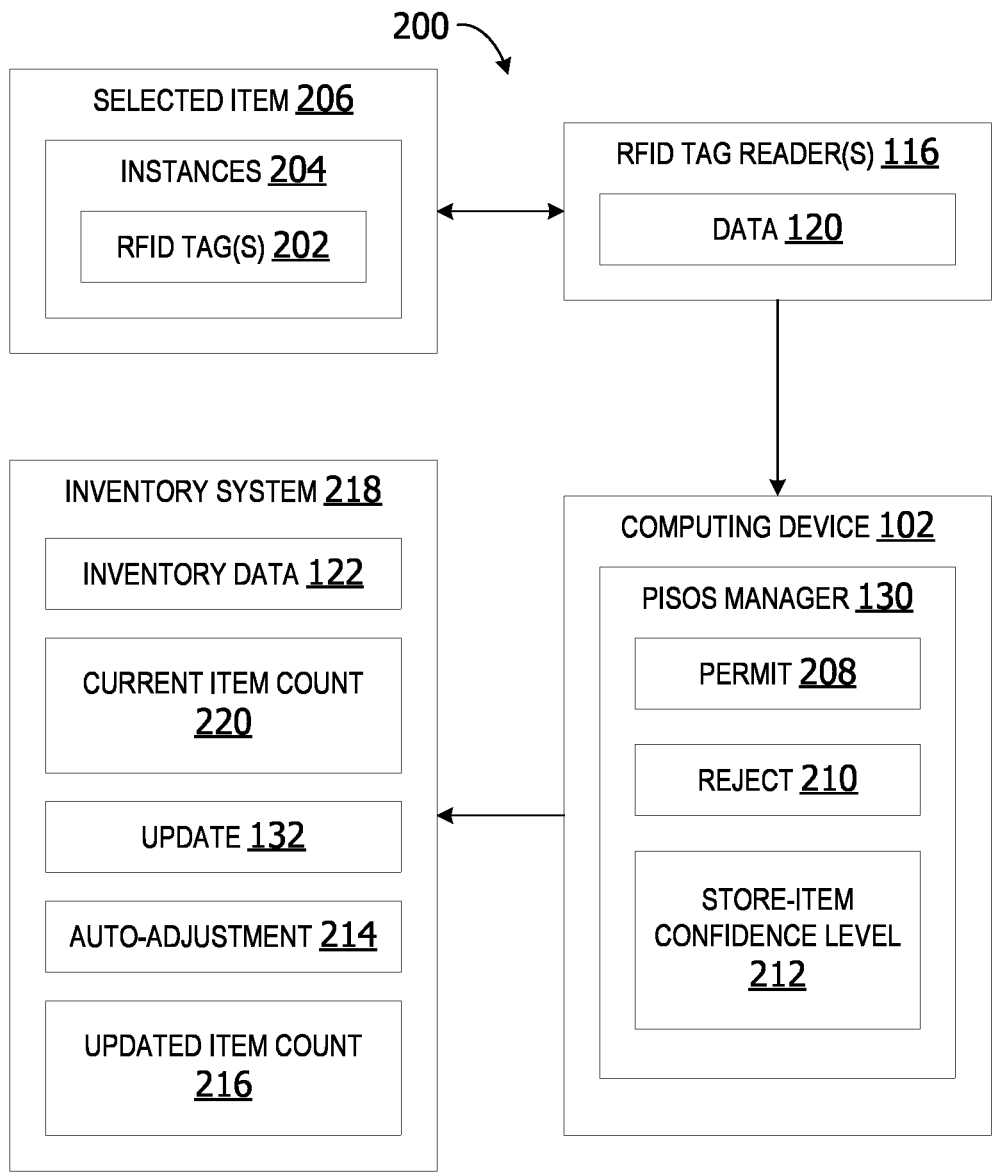
FIG. 2 is an exemplary block diagram illustrating a system including a PISOS manager for determining whether to update inventory data based on RFID tag data.

FIG. 2 is an exemplary block diagram illustrating a system 200 including a PISOS manager 130 for determining whether to update inventory data 124 based on RFID tag data 120. In this example, the RFID tag reader(s) 116 capture RFID tag data 120 from one or more RFID tag(s) 202 associated with one or more instances 204 of a selected item 206 in inventory within an item display area. The item display area is an area within a retail environment that is accessible to customers, such as, but not limited to, an area on a sales floor.

The PISOS manager 130 determines whether to permit 208 a downward adjustment of a current item count 220 value for the selected item 206 in the inventory system 218 or reject 210 the downward adjustment of the current item count 220. If the change to the current on-hand inventory for the selected item 206 is permitted to be made, the change occurs via an auto-adjustment 214. In other words, the current item count 220 is changed to an updated item count 216 via an automated process. The PISOS manager 130 sends the update data to the inventory system 218, which modifies the on-hand inventory values using the detected item counts calculated using the RFID tag data without human intervention.

In some non-limiting examples, the PISOS manager 130 switches a PISOS indicator for a selected item to an off position in response to a store-item confidence level 212. The store-item confidence level 212 is a calculated level of confidence in the accuracy and thoroughness of the detected item count values calculated based on the gathered RFID tag data. The store-item confidence level 212 is a per-store and per-item confidence value calculated using a confidence threshold.

In some example, if the store-item confidence level falls below the confidence threshold indicating a lack of confidence in the detected item count value calculated for the selected item based on the RFID tag data, the PISOS manager 130 sets the PISOS indicator for the item to "off" such that the selected item in ineligible for automatic downward adjustment of inventory item count values.

Figure 3:
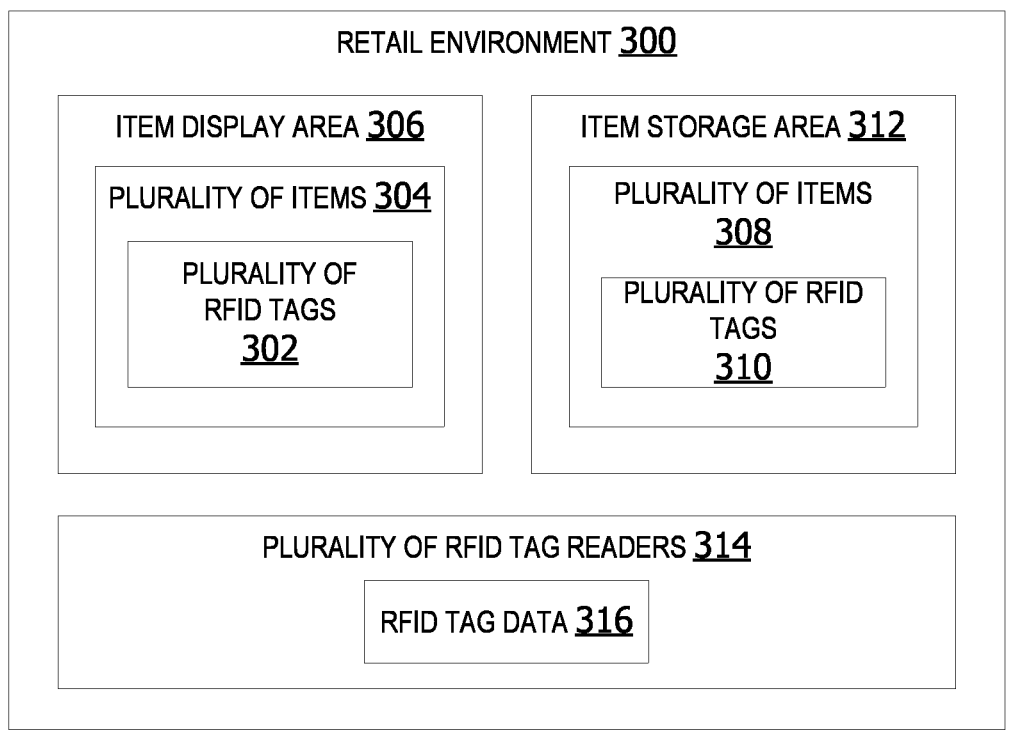
FIG. 3 is an exemplary block diagram illustrating a retail environment including a plurality of RFID tags associated with a plurality of RFID eligible items.

Turning now to FIG. 3, an exemplary block diagram illustrating a retail environment 300 including a plurality of RFID tags associated with a plurality of RFID eligible items is shown. An RFID eligible item is an item having an RFID tag is attached to a portion of an item, attached to a portion of packaging associated with the item, attached to a label or tag associated with the item, printed on the item, or otherwise associated with the item.

In some examples, the retail environment 300 includes an item display area 306. The item display area 306 includes areas accessible to customers, such as, but not limited to, areas on a sales floor. The item display area can include modular displays, such as, but not limited to, shelves, side counters, racks for hanging garments, endcap displays, refrigerated display cases, freezer display cases, cubbies, carts, baskets, tables, or any other types of displays.

The retail environment 300, in other examples, can include an item storage area 312. The item storage area is an area for storing items prior to making the items accessible to customers. The item storage area can include a stockroom, backroom, supply area, trailer, temporary storage area, order fulfillment area, or other area inaccessible to customers. The item storage area 312 includes a plurality of items 308 including a plurality of RFID tags 310 associated with the plurality of items 308.

RFID tag data 316 is obtained from the plurality of RFID tags 302 and/or the plurality of RFID tags 310 by one or more RFID tag readers in a plurality of RFID tag readers 314.

In some examples, the PISOS manager only manages upward or downward adjustments of inventory data using RFID tag data 316 associated with items within the item display area 306. Items within the item storage area 312 are not updated using RFID tag data in these examples.

Figure 4:
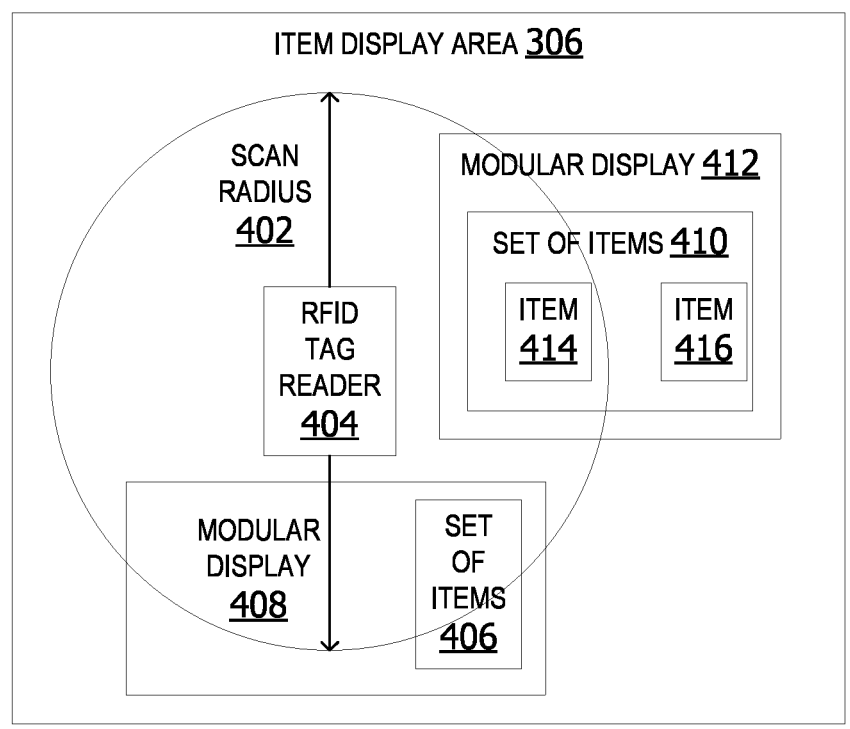
FIG. 4 is an exemplary block diagram illustrating a scan radius associated with an RFID tag reader in an item display area.

FIG. 4 is an exemplary block diagram illustrating a scan radius 402 associated with an RFID tag reader 404 in an item display area 306. The RFID tag reader 404 obtains RFID tag data from RFID tags associated with items within a scan radius 402 of the RFID tag reader 404. In some non-limiting examples, the RFID tag reader 404 has a scan radius of approximately fifteen feet. However, the examples are not limited to a scan radius of fifteen feet. The RFID tag reader 404, in other examples, can be a scanner device having a range that is twelve feet, sixteen feet, or any other scan radius.

In other examples, the scan radius includes a vertical height as well as a horizontal radius. Thus, the higher up an item is stored on a shelf or other display, the less likely it is that the RFID tag attached to the item will register during a scan. In other words, scanning quality degrades as we move upward and outward away from the scanning device (RFID tag reader). In the example above, where the scan radius is fifteen feet, any items stored higher up on a display than the fifteen-foot radius, may fail to register during the scan.

In some examples, the RFID tag reader 404 picks up data from RFID tags associated with items on displays within the scan radius 402. In this non-limiting example, the scan radius includes the set of items 406 on modular display 408. The scan radius includes a portion of the set of items 410 on the modular display 412. In this example, the item 414 is included within the scan radius 402. However, the item 416 is excluded from the scan radius. Therefore, item 414 is detected but item 416 is undetected. In order to capture scan data from the item 416, the RFID tag reader 404 is moved such that the scan radius covers the item 416. If the RFID tag reader scan radius is not moved to cover the item 416, the item 416 will remain undetected and unrepresented in the RFID tag data.

Likewise, if the RFID tag associated with the item 414 is missing, the RFID tag reader will fail to obtain RFID tag data associated with item 414 even though item 414 is within the scan radius 402. If the inventory data is updated using RFID tag data generated by the RFID tag reader in this example, the updated inventory data will be inaccurate, due to the inadvertent exclusion of item 416 from the scan and the missing RFID tag from item 414. Therefore, downward adjustments to RFID tag data can result in inaccurate inventory data. Therefore, the PISOS manager applies the set of PISOS rules to determine whether to permit adjustment of the inventory data using the RFID tag data. This prevents or minimizes inventory errors due to inaccurate or incomplete scans which may fail to obtain RFID tag data associated with every item.

Figure 5:
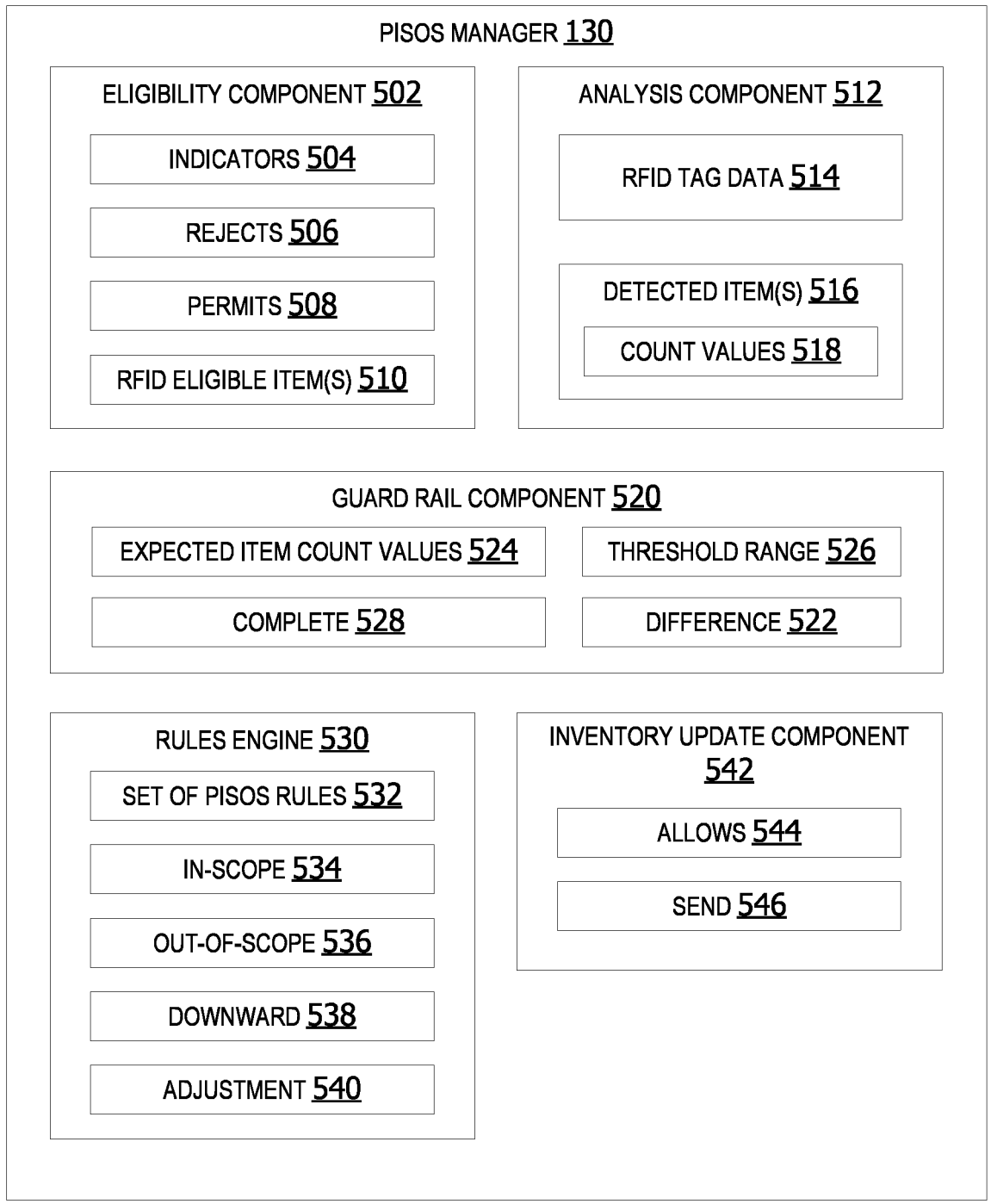
FIG. 5 is an exemplary block diagram illustrating a PISOS manager.

FIG. 5 is an exemplary block diagram illustrating a PISOS manager 130. In some examples, the PISOS manager includes an eligibility component 502. The eligibility component 502 checks one or more indicators 504 to determine whether an item is RFID eligible and subject to PISOS management for automated adjustment of current on-hand inventory count values. In some examples, the indicators include an RFID indicator indicating whether the item or instances of the item are RFID eligible item(s) 510 expected to have an RFID tag.

In some examples, the RFID indicator in item file set up when an item is first entered into the system. An RFID indicator field enables entrance of a "yes" value indicating the item is going to be managed using RFID tag data. A "no" value indicates the item either has no RFID tag or the item is not going to be managed in accordance with RFID tag data obtained from the RFID tag(s) on the item. This enables the system to search and find items managed through RFID data.

In other examples, the indicators 504 include PISOS indicators indicating whether PISOS modification of inventory values for the item are turned on or turned off. If the PISOS indicator is set to off, the PISOS manager rejects 506 adjustment of on-hand inventory using RIFD tag data. If the PISOS indicator is set to off, the PISOS manager permits 508 adjustment of on-hand inventory using RFID tag data if the set of PISOS rules indicates the adjustment is allowable.

The analysis component 512, in some examples, analyzes RFID tag data 514 to determine the count values 518 of detected item(s) 516 scanned by the RFID tag reader(s) or other scanner devices. In other examples, the analysis of the RFID tag data is performed by another component or system, such as, but not limited to, the cloud server 118 in FIG. 1.

A guard rail component 520, in other examples, calculates a difference 522 between expected item count values for one or more items with the detected item count values 518. The guardrail component is a software component implementing guardrail logic to determine if the RFID tag data is close enough to the expected item count values 524 to assume the scan was thorough and complete.

If the number of items scanned is greater than or equal to a store-item confidence threshold, the guardrail component verifies the scan was complete, as it detected most of the items that were expected to be found during the scan. If the number of items found in the scan is less than the minimum store-item threshold, the scan falls below the minimum confidence level indicating the scan did not capture enough of the expected items to be considered complete.

In some non-limiting examples, once a user has done everything required to scan/gather tag data, the guardrail logic takes into account what items were scanned at a department level. The guardrail logic compares the number of RFID tags found in the scan versus the number of RFID tags expected to be found. The system expects to find a certain threshold number of items during a scan for the guardrail logic to consider the scan complete. In one example, the system expects to find 70% of all tags of a number of expected tags. If 70% of the tags are found, the scan was a good scan at a department level (completed satisfactorily).

In other examples, the threshold range 526 is an allowable difference between the expected number of items/types of items and the detected number of items and/or types of items. If the threshold indicates a number of items, the number of instances of each type of items is compared with the threshold. For example, if the system expects to find ten instances of a size medium jacket and five instances of a size large jacket, the scan may be considered complete if nine instances of the size medium and instances of the size large jacket are found in the scan.

If the threshold indicates types of items, the number of different types of items detected in the scan is compared with the expected assortment of items. For example, if the expected assortment of items includes five different types of apparel items (long-sleeved shirts, short-sleeved shirts, t-shirts, sleeveless shirts, and jackets), the scan is complete if at least one of each type of item is captured in the scan.

If the difference is within a threshold range 526, the guardrail component determines that the scan was complete 528. A complete scan is a scan that is determined to have gathered most of the RFID tag data from a majority of items within the item display area. For example, if the detected item count values indicates that ninety percent of the expected number of items were detected in the scan, and the threshold is eighty percent, then the guardrail component determines the scan was complete. However, if the detected items is only seventy percent of the expected number of items, then the scan was incomplete as the difference between the detected items and expected items is greater than the threshold range of twenty percent difference (minimum threshold of eighty percent of the expected items).

In some examples, a rules engine 530 is a software component that applies a set of PISOS rules 532 to one or more items to determine if the items are in-scope 534 for inventory adjustment using RFID tag data or out-of-scope 536 for downward 538 adjustment 540 of the current inventory data.

If an item is in-scope 534 for downward 538 adjustment 540, an inventory update component 542 allows 544 the auto-adjustment to inventory. In some example, the inventory update component 542 can send 546 the RFID tag data and/or the detected item(s) 516 count values 518 to an inventory system for updating the inventory data. In other examples, the PISOS manager 130 updates the inventory data directly.

FIG. 6 is an exemplary block diagram illustrating a set of PISOS rules 600. The set of PISOS rules 600, in some examples, include an RFID eligible rule 602. The RFID eligible rule 602 indicates that an item RFID indicator set to "yes" indicates the item is or should be associated with an RFID tag. In other words, an item having an RFID tag is RFID eligible. If the RFID indicator is set to no, it indicates instances of this item are not expected to have an RFID tag.

The PISOS indicator rule 604, in other examples, indicates that an item having a PISOS indicator set to "on" is eligible for upward or downward adjustment of inventory data based on RFID tag data if the PISOS rules permit it. If the indicator is set to "off", the inventory data for the item is not altered based on RFID tag data.

In some examples, the default setting for the PISOS indicator is "off." In other words, the PISOS indicator is automatically set of "off" for all item, preventing downward adjustment of on-hand inventory using scan data, such as, but not limited to, RFID tag data. The PISOS indicator can be automatically switched to "on" by the PISOS manager or manually switched to "on" by a user. In some examples, the PISOS manager only switches a PISOS indicator from "off" to "on" if at least one instance of the item is scanned within the item display area (sales floor). Items which are only located in an item storage area (backroom/stockroom) are always switched to "off", in this example.

In some examples, the default downward adjustment rule 606 indicates that the on-hand inventory data for any item which does not qualify under the set of PISOS rules 600 should not be altered based on detected item counts obtained from RFID tag data. In other words, the default setting is to not change inventory count numbers downward using RFID tag data obtained during item scans. Likewise, a default upward adjustment rule 608 indicates that inventory data is always updated upwards (increased) based on RFID tag data indicating a higher number of items than the current on-hand inventory data. Thus, the default rules specify that the inventory data is always increased based on RFID tag data but never decreased based on RFID tag data.

In other examples, the feature rule 610 specifies that inventory count values for an item should not be altered based on RFID tag data obtained during a scan within the item display area if the detected number of items exceeds the known capacity of the display on which the items are assigned. Thus, if RFID tag data indicates more items present than should be able to fit on a display, the system assumes some of the detected items are located in inaccessible spaces, such as top stock shelves and other inaccessible restock/overflow storage spaces rather than on the customer accessible portion of the display. In such cases, it is inappropriate to change on-hand inventory items to reflect items which are inaccessible to customers. Therefore, on-hand inventory is not changed upward if the number of detected items is greater than the capacity of display spaces which are accessible to customers.

In some examples, the feature rule is applied to prevent upward or downward adjustment of inventory. In these examples, instances of an item can be stored on a top portion of a display (top stock shelf), where extra product is stored for restocking lower shelves or counters which are more accessible to customers. For example, if a scan of socks detects a higher number of pairs of socks than a side counter is capable of storing, it indicates some of the scanned socks were likely on the top stock shelf or other area inaccessible to customers. On-hand changes to inventory are not accepted in an upward adjustment or a downward adjustment until the number of items scanned is within a reasonable range of what fits on or in the side counter.

The system also takes into account location of scanned items. If items are located in a difficult to scan area, the data is given a lower confidence score and is less likely to be used to adjust on-hand inventory data. For example, if items are located on a high shelf where scan quality tends to degrade, the data is given a lower confidence score. Likewise, if the items are located within a trailer or other difficult to scan area, it is a lower confidence scan. Thus, the system takes the location of scanned items into account when making an eligibility determination for downward inventory adjustments.

The guardrail rule 612, in other examples, specifies that RFID tag data is not used to update inventory data downward unless the scan is complete. The scan is complete if the number of items detected is within a threshold range of the expected number of items. This ensures that on-hand inventory is not adjusted downward using incomplete or inaccurate scan data. Scan data can be incomplete or inaccurate if the scan radius fails to encompass all items and/or if some RFID tags are missing or damaged.

The verification rule 614 enables downward adjustment of on-hand inventory if a manual verification of detected item count values is verified via an alternative scan, visual inspection by a human user, manual hand count by a human user, and/or verification using other data, such as, but not limited to, item out reports, nil pick data, and other data indicating the downward adjustment of the inventory may be warranted. Nil pick data refers to reports by customers or employees indicating an inability to locate an item in a display or other location assigned to the item. An alternative scan refers to a scan using barcode data, such as, but not limited to, universal product code (UPC) scans, matrix barcode scans, or other types of scans.

Figure 7:
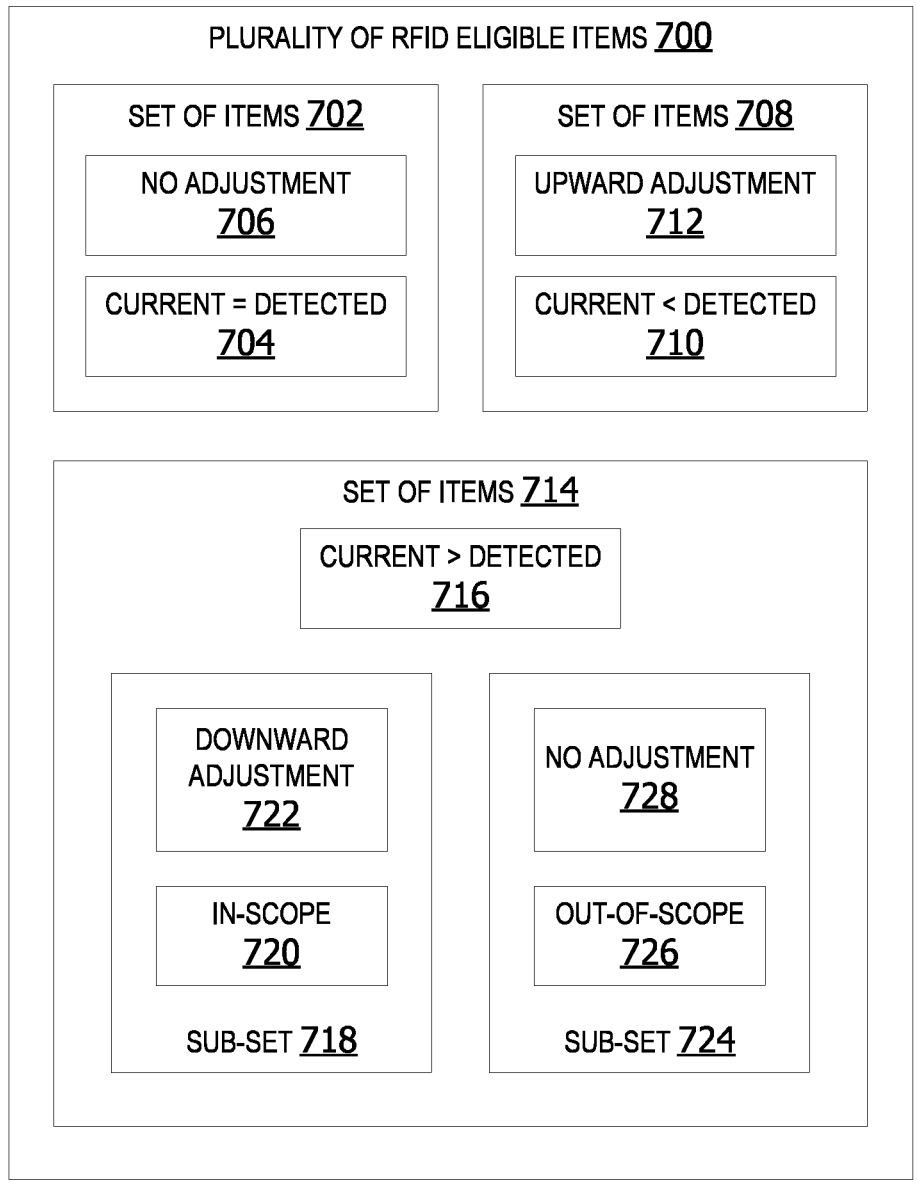
FIG. 7 is an exemplary block diagram illustrating a plurality of RFID eligible items including in-scope items and out-of-scope items.

FIG. 7 is an exemplary block diagram illustrating a plurality of RFID eligible items 700 including in-scope items and out-of-scope items. In some examples, the plurality of RFID eligible items 700 includes a set of one or more items 702 having a current inventory count value equal to the detected item count value 704. In such cases, no adjustment 706 to inventory data is necessary.

In other examples, a set of one or more items 708 having a current on-hand inventory count value that is less than the detected item count value 710. The upward adjustment 712 of the inventory data is permitted by the PISOS rules.

In still other examples, the set of items 714 includes one or more items having a current on-hand inventory count value that is greater than the detected item count value 716. A sub-set 718 of items in the set of items 714 include one or more items which are in-scope 720 and qualified for downward adjustment 722 of the inventory data in accordance with the PISOS rules.

In yet other examples, a sub-set 724 of items in the set of items 714 are determined to be out-of-scope 726 in accordance with the set of PISOS rules. In this example, no adjustment 728 is made to the inventory data. Instead, the current on-hand inventory count values are maintained without alteration.

Figure 8:
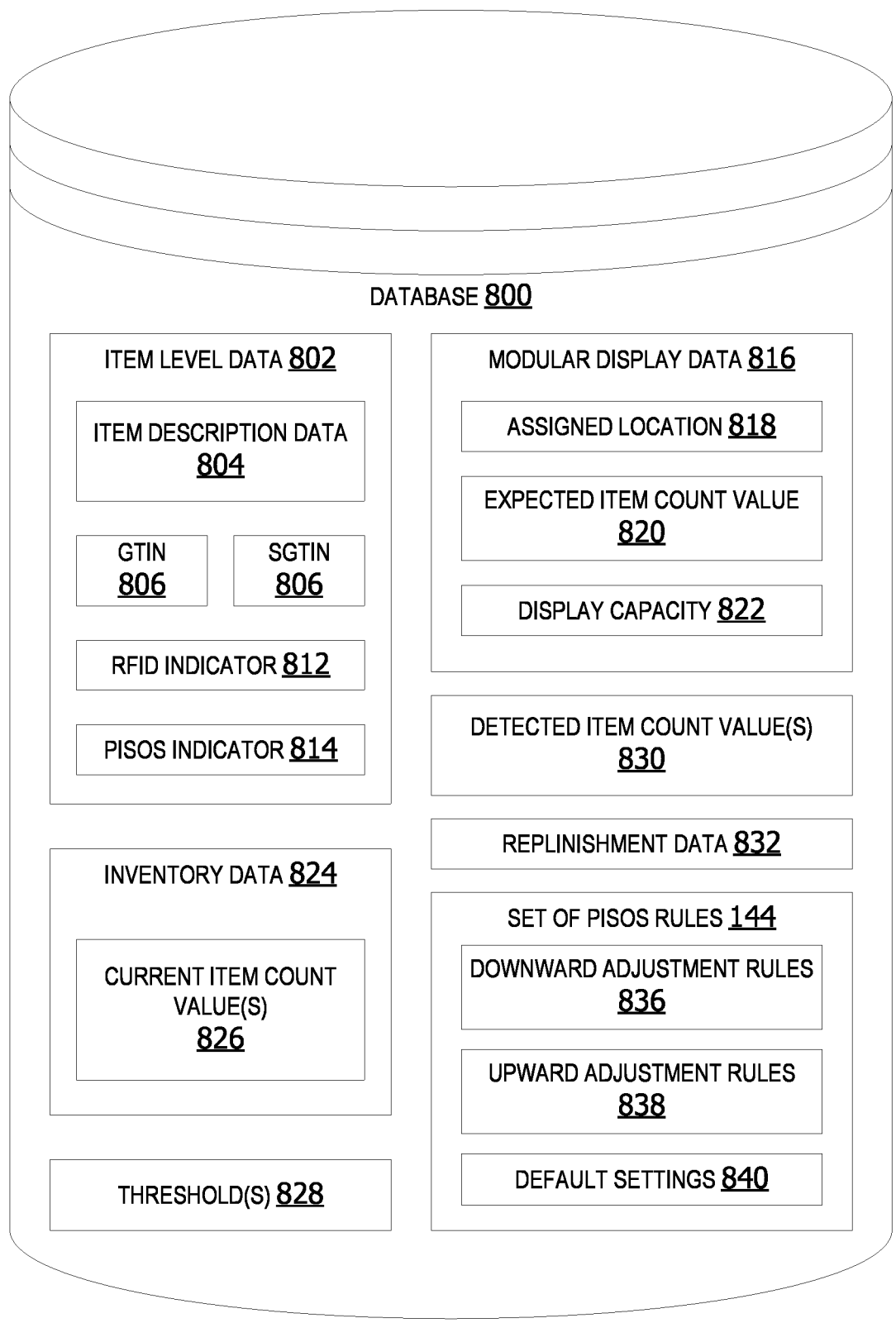
FIG. 8 is an exemplary block diagram illustrating a database storing data utilized by the PISOS system.

FIG. 8 is an exemplary block diagram illustrating a database 800 storing data utilized by the PISOS system. In some examples, the data includes item description data 802. The item description data includes item names of items, size, item count per package, weight, variety, and any other item description data. GTIN 806 is a global trade identification number for identifying a type of item. For example, all pink polo shirts from a common manufacturer and/or brand have the same GTIN. SGTIN 810 is a serialized GTIN identifier. Every instance of a type of item has a unique SGTIN. For example, every pink polo shirt has a unique SGTIN which is not shared by another item in inventory. The RFID indicator 812 is an indicator indicating whether an item is RFID eligible. The PISOS indicator 814 indicates whether an item is eligible for downward inventory data adjustment if the item complies with the set of PISOS rules 834.

Modular display data 816, in some examples, includes the assigned location 818 of a display within the retail environment. A display may be located within an item display are or an item storage area. The modular display data 816 can also include an expected item count value 820 and/or a display capacity 822 of the display. The expected item count value 820 is the number of items the system expects to find during a scan. The expected item count value can be equal to the current on-hand inventory count value. The display capacity 822 is the number of items of a given type which can be stored on a display, such as hanging on a rack, stacked on a shelf, sitting within a cabinet, etc. The display capacity of a given display varies depending on the size and weight of the items stored on the display.

Inventory data 824, in some examples, includes current item count value(s) 826 for each item in inventory. The inventory data 824 is updated in accordance with the set of PISOS rules 834.

One or more threshold(s) 828 may optionally be stored in the database 800. The threshold(s) 828 can include a confidence threshold value and/or a confidence threshold range for determining whether an item scan reaches a minimum store-item confidence level.

Detected item count value(s) 830 may also be stored in the database 800. The detected item count value(s) 830 include the number of items scanned during at least one scan. The detected item count value(s) 830 can include the count values for one or more scanned items.

Replenishment data 832 indicates whether an item is eligible for replenishment. If an item is not eligible for replenishment, it is unnecessary to update the inventory data for that item, as additional instances of the item will not be ordered to replenish inventory when the number of instances of the item runs low (reaches a replenishment level). Thus, the PISOS manager, in some examples, checks replenishment data 832 to determine whether to update inventory data for an item based on the RFID tag data.

The set of PISOS rules 144 incudes downward adjustment rules 836 applied to determine whether an item qualifies for downward adjustment of the inventory data for that item. The upward adjustment rules 838 includes one or more rules for determining whether to adjust the inventory count for an item upward based on RFID tag data. In some examples, the upward adjustment rules includes a default rule to upwardly adjust inventory count values for all RFID eligible items.

The default settings 840, in other examples, prevents downward adjustment of inventory count values while permitting upward adjustment of inventory count values based on the RFID tag data.

Figure 9:
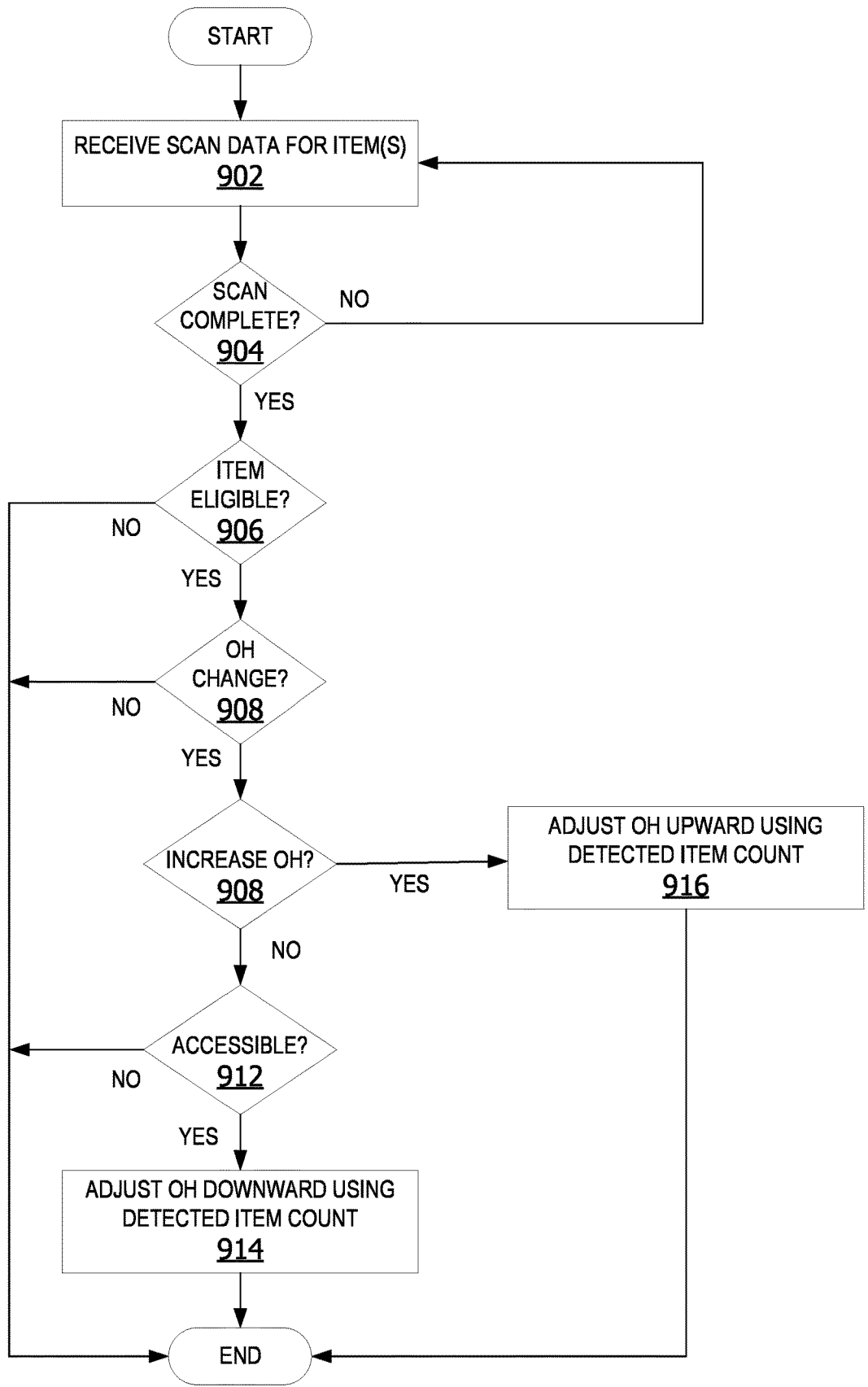
FIG. 9 is an exemplary flow chart illustrating operation of the computing device to determine whether an item is eligible for automatic downward adjustment of on-hand inventory.

Referring now to FIG. 9, an exemplary flow chart illustrating operation of the computing device to determine whether an item is eligible for automatic downward adjustment of on-hand inventory is shown. The process shown in FIG. 9 is performed by a PISOS manager component, executing on a computing device, such as the computing device 102 in FIG. 1.

The process begins by receiving scan data for one or more items at 902. The scan data is data obtained from a scanner device, such as, but not limited to, the data 120 and/or the RFID tag data 126 in FIG. 1. The PISOS manager determines whether the scan is complete at 904. In some examples, the PISOS manager determines the scan is complete if a difference between the detected item count value for a selected item and the expected item count value for the selected item is within a threshold range. If the scan is complete, the PISOS manager determines whether the item is eligible at 906. The item is eligible for PISOS controlled inventory updates if the RFID indicator is set to "yes" indicating instances of the item are RFID tagged.

If the item is eligible at 906, the PISOS manager determines whether an on-hand inventory change is indicated at 908. An on-hand inventory change is indicated if the detected item count value is greater than the current on-hand inventory count value or less than the current on-hand inventory count value. If the on-hand change is indicated, the PISOS manager determines whether the data indicates an increase to on-hand inventory at 910. An increase is indicated if the detected item count values is greater than the current on-hand inventory count values. If no, the PISOS manager determines if the item is located in an accessible location within the item display area at 912. An accessible area is an area in which a customer can view and/or obtain access to the item for purchase. If yes, the PISOS manager adjusts on-hand inventory count value downward using the detected item count at 914. The process terminates thereafter.

Returning to 910, if the data does indicate an increase in on-hand inventory count value for the item, the PISOS manager adjusts the on-hand inventory count values upward using the detected item count value at 916. The process terminates thereafter.

While the operations illustrated in FIG. 9 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 9.

Figure 10:
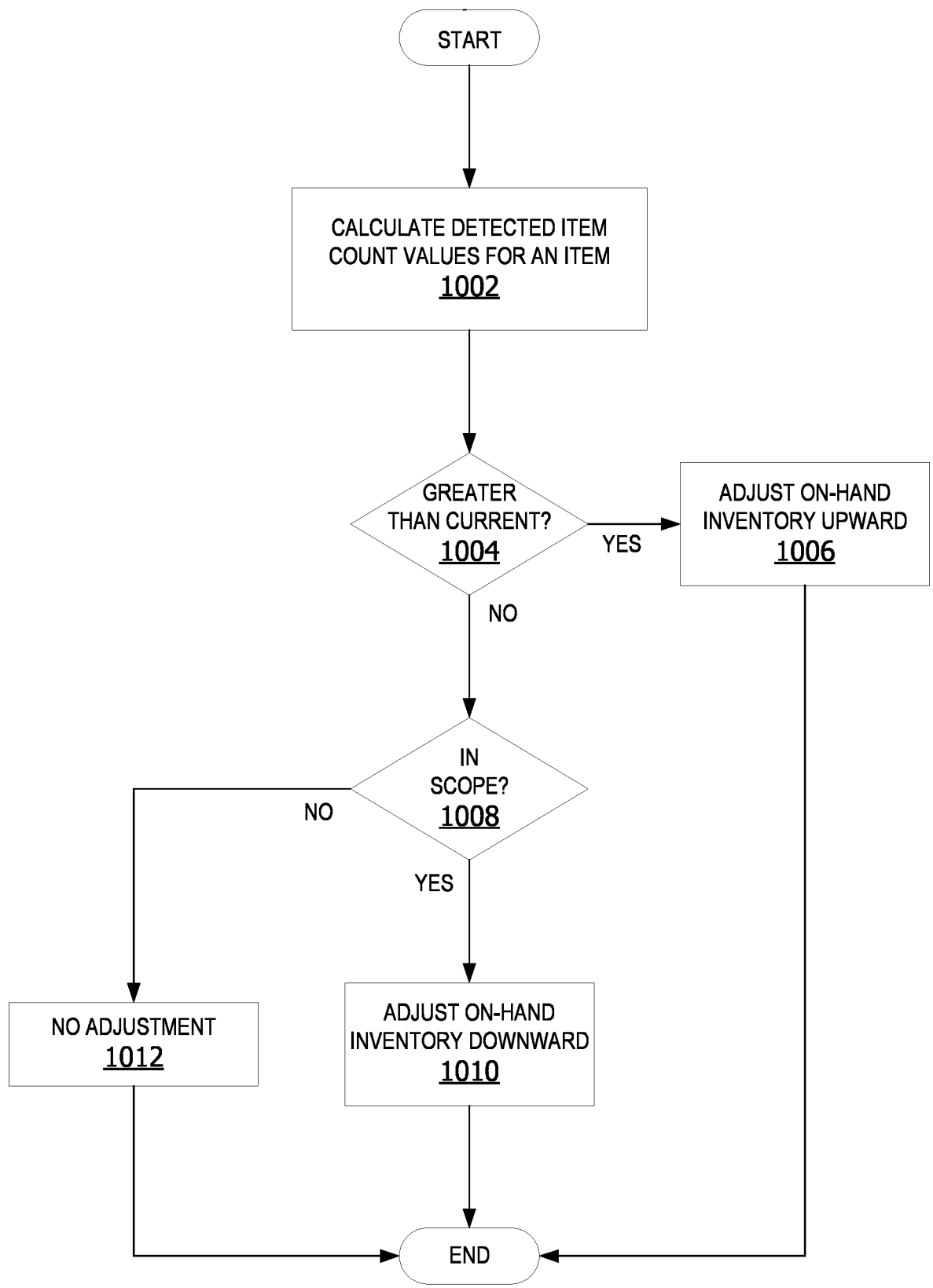
FIG. 10 is an exemplary flow chart illustrating operation of the computing device to adjust on-hand inventory values for items based on PISOS rules.

FIG. 10 is an exemplary flow chart illustrating operation of the computing device to adjust on-hand inventory values for items based on PISOS rules. The process shown in FIG. 10 is performed by a PISOS manager component, executing on a computing device, such as the computing device 102 in FIG. 1.

The process begins by calculating detected item count values for a plurality of items at 1002. The PISOS manager determines if the detected item count value is greater than the current on-hand inventory count value for an item at 1004. If yes, the PISOS manager adjusts on-hand inventory upward in accordance with the detected item count values at 1006.

If the detected item count value is not greater than the current on-hand inventory count values, the PISOS manager determines whether the item is in-scope for downward inventory adjustments at 1008. If yes, the PISOS manager automatically adjusts on-hand inventory downward at 1010. In some examples, the PISOS manager directly adjusts the inventory data to reflect the lower detected item count value. In other examples, the PISOS manager transmits the detected item count value to an inventory system, which automatically adjusts the inventory data for the selected item.

If the item is not in-scope at 1008, a downward adjustment is not permitted. In such cases, the PISOS manager makes no adjustment to the current on-hand inventory count values at 1012. The process terminates thereafter.

While the operations illustrated in FIG. 10 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 10.

Figure 11:
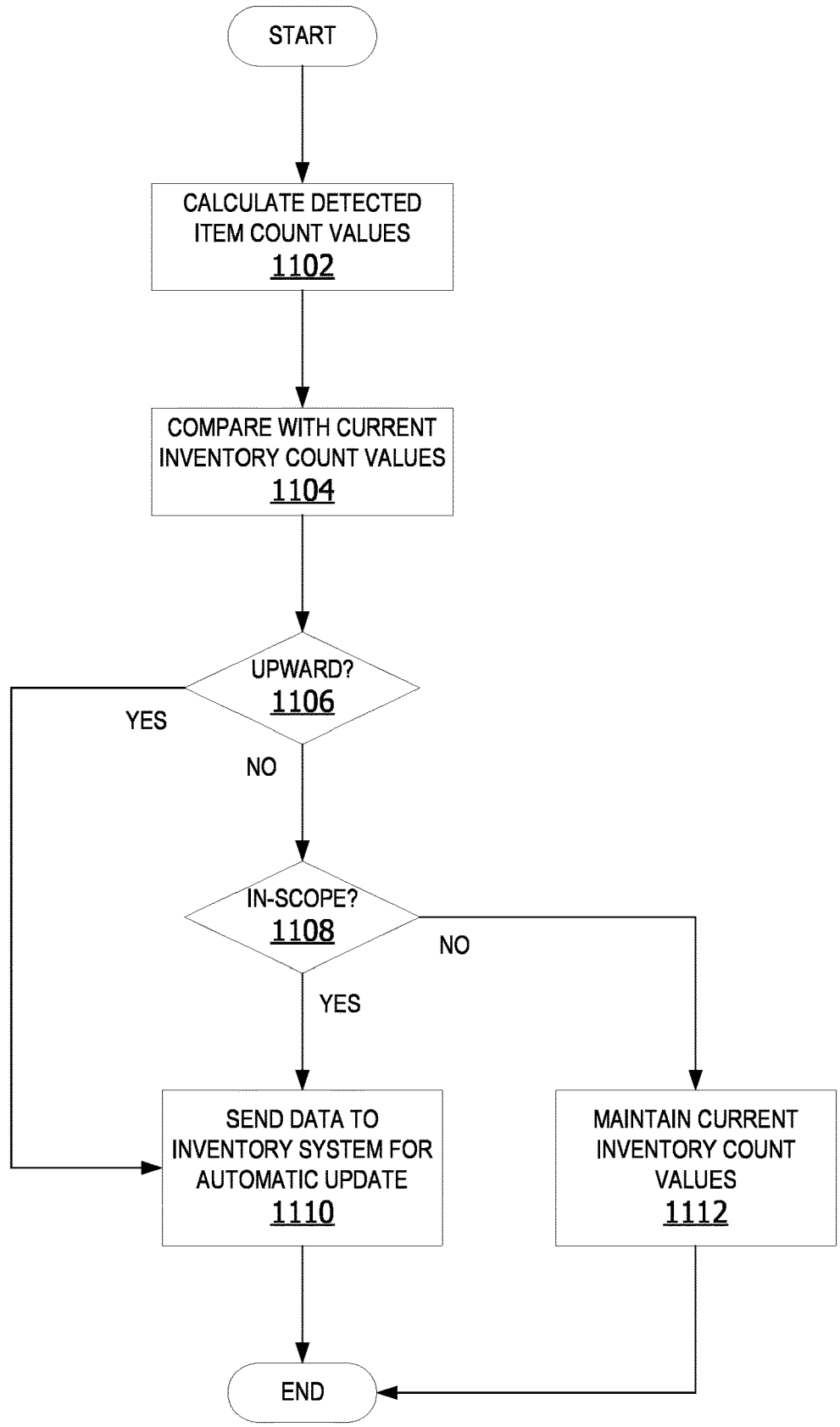
FIG. 11 is an exemplary flow chart illustrating operation of the computing device to determine whether to provide detected item count data to an inventory system for automatic update of on-hand inventory based on RFID tag data.

FIG. 11 is an exemplary flow chart illustrating operation of the computing device to determine whether to provide detected item count data to an inventory system for automatic update of on-hand inventory based on RFID tag data. The process shown in FIG. 11 is performed by a PISOS manager component, executing on a computing device, such as the computing device 102 in FIG. 1.

The process begins by calculating detected item count values at 1102. The detected item count values reflect the number of items detected via item scanning using one or more scanning devices, such as, but not limited to, the RFID tag reader(s) 116 in FIG. 1. The PISOS manager compares the current inventory count values with the detected item count values at 1104. The PISOS manager determines whether the detected item count value indicates an upward adjustment to the on-hand inventory item count at 1106. If yes, the PISOS manager sends the data to the inventory system for automatic update at 1110. The data can include the RFID tag data and/or the detected item count data.

If the detected item count is not greater than the current on-hand inventory count values indicating an upward adjustment to inventory data, the PISOS manager determines if the item is in-scope for downward inventory adjustments at 1108. If yes, the PISOS manager sends data to the inventory system for automatic update at 1110. If the item is not in-scope at 1108, the PISOS manager maintains current inventory count values at 1112. The process terminates thereafter.

While the operations illustrated in FIG. 11 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 11.

Additional Examples

In some examples, the system controls lowering on-hand inventory count values for items based on RFID tag data. The system sets an RFID indicator to "on" for items having RFID tags which are subject to the PISOS rules for downward adjustment of on-hand inventory. The system uses a series of rules to determine whether to lower on-hand inventor count values using the RFID tag data obtained by scanning the RFID tags on the product.

In some non-limiting examples, the system determines whether the item is in-scope/eligible for adjusting on-hand inventory downward. Items which are out-of-scope are considered ineligible for downward modification of on-hand inventory based on RFID scan results. The system applies RFID product in-scope and out-of-scope (PISOS) rule to determine whether to change on-hand inventory values down or leave on-hand inventory values alone (maintain previous inventory values without adjustment based on RFID scan data).

In other examples, the system determines whether to turn on or turn off auto-adjustment of on-hand inventory values based on a confidence rule. The confidence rule specifies that all or most of the instances of an item are tagged, and most items have been scanned on the sales floor and in a backroom (storeroom). If this is the case, the system has confidence that the scan is complete and thorough/accurate.

The system permits downward adjustment of items/products which are subject to a complete, high-confidence scan and located in specified locations on the salesfloor which are accessible to customers for viewing and/or purchase. The system does not modify on-hand inventory numbers if scan results indicate quantity of item greater than the known capacity of the modular display/side counter on which the items are displayed or stored.

Alternatively, or in addition to the other examples described herein, examples include any combination of the following:

a data storage device storing current inventory count values associated with a plurality of radio frequency identification (RFID) eligible items;

adjust, by an eligibility component, current on-hand inventory count values associated with a first set of items in the plurality of items downward based on detected item count values generated using RFID tag data on condition the detected item count values associated with the first set of items exceeds current on-hand inventory count values associated with the first set of items;

apply, by a rules engine, a set of product in-scope out-of-scope (PISOS) rules to a second set of items having detected item count values lower than the current on-hand inventory count values;

wherein downward adjustment of the current on-hand inventory count values associated with an item in the second set of items is allowed on condition application of the set of PISOS rules indicates the item is in-scope for downward adjustment;

wherein the downward adjustment for the item is rejected on condition the application of the set of PISOS rules indicates the item is out-of-scope for downward adjustment;

reject, by the eligibility component, downward adjustment of the current on-hand inventory count values for a first sub-set of items within the second set of items identified as out-of-scope;

wherein a second sub-set of items within the second set of items is in-scope for downward adjustment of the current on-hand inventory count values;

send, by an inventory update component, the detected item count values associated with the second sub-set of items to an inventory system for downward adjustment of the current on-hand inventory count values of the second sub-set of items;

a guardrail component that compares the detected item count value associated with a selected item to an expected item count value associated with the selected item;

wherein a scan for instances of the selected item is complete if a difference between the detected item count value and the expected item count value is within a store-item threshold range;

the data storage device comprising a set of indicators, wherein the eligibility component checks the set of indicators associated with the selected item indicating whether the selected item is eligible for automatic downward inventory adjustment using the RFID tag data based on a set of product in-scope out-of-scope (PISOS) rules, wherein the set of indicators comprises an RFID eligibility indicator indicating whether instances of the selected item are expected to be RFID tagged;

the data storage device comprising a set of indicators, wherein the eligibility component checks the set of indicators associated with the selected item indicating whether the selected item is eligible for automatic downward inventory adjustment using the RFID tag data based on a set of product in-scope out-of-scope (PISOS) rules;

wherein the set of indicators comprises a PISOS indicator indicating whether downward adjustment of a current item count value associated with instances of the selected item is permitted based on compliance with the set of PISOS rules;

a modular display associated with an assigned location of at least one instance of the selected item within an item display area;

wherein the rules engine compares a capacity associated with the modular display with the detected item count value to determine whether the detected item count value exceeds the calculated display capacity;

wherein an upward adjustment of the current item count value is permitted in response to a determination the calculated display capacity is equal to or greater than the detected item count value;

verify the detected item count value represents instances of a selected item located within the item display area accessible to users;

wherein detected item count values associated with items within an item storage area or areas inaccessible to users are rejected for downward on-hand inventory adjustments;

a store-item confidence level associated with a selected item, wherein the store-item confidence level is compared with the detected item count value associated with instances of the selected item within an item display area;

wherein a PISOS indicator is turned off in response to the store-item confidence level indicating a lack of confidence in the detected item count value calculated based on the RFID tag data;

wherein the selected item in ineligible for automatic downward adjustment of inventory item count values when the PISOS indicator is turned off;

permitting, by an eligibility component, upward adjustment of current on-hand inventory count values associated with a first set of items in the plurality of items using detected item count values generated based on analysis of RFID tag data on condition the detected item count values associated with the first set of items exceeds current on-hand inventory count values associated with the first set of items;

applying, by a rules engine, a set of product in-scope out-of-scope (PISOS) rules to a second set of items having detected item count values lower than the current on-hand inventory count values;

rejecting, by the eligibility component, downward adjustment of the current on-hand inventory count values for a first sub-set of items within the second set of items identified as out-of-scope;

providing, by an inventory update component, the detected item count values associated with a second sub-set of items from the second set of items to an inventory system for downward adjustment of the current on-hand inventory count values associated with the second sub-set of items in response to identification of the second sub-set of items as in-scope for the downward adjustment;

comparing the detected item count value associated with a selected item to an expected item count value associated with the selected item, wherein a scan for instances of the selected item is complete if a difference between the detected item count value and the expected item count value is within a store-item threshold range;

checking, by an eligibility component, a set of indicators associated with the selected item indicating whether the selected item is eligible for automatic downward inventory adjustment using the RFID tag data based on a set of product in-scope out-of-scope (PISOS) rules;

checking a set of indicators associated with a selected item indicating whether the selected item is eligible for automatic downward inventory adjustment using the RFID tag data based on a set of product in-scope out-of-scope (PISOS) rules;

comparing a capacity of a modular display associated with an assigned location of at least one instance of the selected item within an item display area with the detected item count value to determine whether the detected item count value exceeds the calculated display capacity;

verifying the detected item count value represents instances of a selected item located within the item display area accessible to users;

switching a PISOS indicator for a selected item to an off position in response to a store-item confidence level indicating a lack of confidence in the detected item count value calculated for the selected item based on the RFID tag data;

maintain, by the eligibility component, downward adjustment of the current on-hand inventory count values for a first sub-set of items within the second set of items identified as out-of-scope; and transmit, by an inventory update component, the detected item count values associated with a second sub-set of items from the second set of items to an inventory system for downward adjustment of the current on-hand inventory count values associated with the second sub-set of items in response to identification of the second sub-set of items as in-scope.

At least a portion of the functionality of the various elements in FIG. 1, FIG. 2, FIG. 3, FIG. 4, FIG. 5, FIG. 5, FIG. 7, and FIG. 8 can be performed by other elements in FIG. 1, FIG. 2, FIG. 3, FIG. 4, FIG. 5, FIG. 6, FIG. 7 and FIG. 8, or an entity (e.g., processor 106, web service, server, application program, computing device, etc.) not shown in FIG. 1, FIG. 2, FIG. 3, FIG. 4, FIG. 5, FIG. 6, FIG. 7, and FIG. 8.

In some examples, the operations illustrated in FIG. 9, FIG. 10, and FIG. 11 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other examples, a computer readable medium having instructions recorded thereon which when executed by a computer device cause the computer device to cooperate in performing a method of managing automatic inventory updates using RFID tag data, the method comprising permitting upward adjustment of current on-hand inventory count values associated with a first set of items in the plurality of items using detected item count values generated based on analysis of RFID tag data on condition the detected item count values associated with the first set of items exceeds current on-hand inventory count values associated with the first set of items; applying a set of product in-scope out-of-scope (PISOS) rules to a second set of items having detected item count values lower than the current on-hand inventory count values; rejecting downward adjustment of the current on-hand inventory count values for a first sub-set of items within the second set of items identified as out-of-scope; and sending the detected item count values associated with a second sub-set of items from the second set of items to an inventory system for downward adjustment of the current on-hand inventory count values associated with the second sub-set of items in response to identification of the second sub-set of items as in-scope for the downward adjustment.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

While no personally identifiable information is tracked by aspects of the disclosure, examples have been described with reference to data monitored and/or collected from the users. In some examples, notice is provided to the users of the collection of the data (e.g., via a dialog box or preference setting) and users are given the opportunity to give or deny consent for the monitoring and/or collection. The consent can take the form of opt-in consent or opt-out consent.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable, and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for PISOS management of RFID tagged items. For example, the elements illustrated in FIG. 1, FIG. 2, FIG. 3, FIG. 4, FIG. 5, FIG. 6, FIG. 7, and FIG. 8, such as when encoded to perform the operations illustrated in FIG. 9, FIG. 10, and FIG. 11 constitute exemplary means for making upward adjustment of current on-hand inventory count values associated with a first set of items in the plurality of items using detected item count values generated based on analysis of RFID tag data on condition the detected item count values associated with the first set of items exceeds current on-hand inventory count values associated with the first set of items; exemplary means for using a set of product in-scope out-of-scope (PISOS) rules to determine whether to make downward on-hand inventory adjustments using RFID tag data; exemplary means for rejecting downward adjustment of the current on-hand inventory count values for a first sub-set of items within the second set of items identified as out-of-scope; and permitting downward adjustment of the on-hand inventory count values for a second sub-set of items that is PISOS in-scope.

Other non-limiting examples provide one or more computer storage devices having a first computer-executable instructions stored thereon for providing PISOS rules-based management of automatic inventory updates. When executed by a computer, the computer performs operations including adjusting current on-hand inventory count values associated with a first set of items in the plurality of items upwards based on detected item count values generated based on analysis of RFID tag data on condition the detected item count values associated with the first set of items exceeds current on-hand inventory count values associated with the first set of items; applying a set of product in-scope out-of-scope (PISOS) rules to a second set of items having detected item count values lower than the current on-hand inventory count values; rejecting downward adjustment of the current on-hand inventory count values for a first sub-set of items within the second set of items identified as out-of-scope; and sending the detected item count values associated with a second sub-set of items from the second set of items to an inventory system for downward adjustment of the current on-hand inventory count values associated with the second sub-set of items in response to identification of the second sub-set of items as in-scope for the downward adjustment.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either" "one of" "only one of" or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. An inventory management system comprising:
   a processor;
   a memory communicatively coupled to the processor and having stored thereon computer-executable instructions causing the processor to:
   obtain radio frequency identification (RFID) tag data associated with a plurality of items from at least one RFID tag reader to determine an item count values, wherein the plurality of items is associated with a modular display;
   calculate a confidence score, wherein the confidence score is based on at least a location of the plurality of items;
   compare the confidence score against a confidence threshold value and in response to the confidence score equaling or exceeding the confidence threshold value, apply a set of product in-scope out-of-scope (PISOS) rules, via a PISOS manager, to the plurality of items; the set of PISOS rules comprising:
   determine a first set of items within the plurality of items having detected item count values lower than a current on-hand inventory count values;
   reject a downward adjustment of the current on-hand inventory count values for a first sub-set of items within the first set of items identified as out-of-scope based on application of the set of PISOS;
   send the detected item count values associated with a second sub-set of items within the first set of items for downward adjustment of the current on-hand inventory count values of the second sub-set of items, wherein the second sub-set of items is in-scope for the downward adjustment of the current on-hand inventory count values based on the application of the set of PISOS rules; and
   adjust, automatically, the current on-hand inventory count values associated with a second set of items in the plurality of items upward based on detected item count values in response to:
      a first condition where the detected item count values associated with the second set of items exceeds the current on-hand inventory count values associated with the second set of items, and
      a second condition where a capacity value associated with the modular display is equal to or greater than the detected item count values associated with the second set of items.

2. The inventory management system of claim 1, further comprising:
   a guardrail component that compares the detected item count value associated with a selected item to an expected item count value associated with the selected item, wherein a scan for instances of the selected item is complete if a difference between the detected item count value and the expected item count value is within a store-item threshold range.

3. The inventory management system of claim 1, further comprising:
   a data storage device comprising a set of indicators, wherein an eligibility component checks the set of indicators associated with a selected item indicating whether the selected item is eligible for automatic downward inventory adjustment using the RFID tag data based on a set of product in-scope out-of-scope (PISOS) rules, wherein the set of indicators comprises an RFID eligibility indicator indicating whether instances of the selected item are expected to be RFID tagged.

4. The inventory management system of claim 1, further comprising:
   a data storage device comprising a set of indicators, wherein an eligibility component checks the set of indicators associated with a selected item indicating whether the selected item is eligible for automatic downward inventory adjustment using the RFID tag data based on the set of PISOS rules, wherein the set of indicators comprises a PISOS indicator indicating whether downward adjustment of a current on-hand inventory item count value associated with instances of the selected item is permitted based on compliance with the set of PISOS rules.

5. The inventory management system of claim 1, wherein the computer-executable instructions further cause the processor to:
   verify the detected item count value represents instances of a selected item located within an item display area accessible to users, wherein detected item count values associated with items within an item storage area are rejected for downward on-hand inventory adjustments.

6. The inventory management system of claim 1, further comprising:
   a store-item confidence level associated with a selected item, wherein the store-item confidence level is compared with the detected item count value associated with instances of the selected item within an item display area, wherein a PISOS indicator is turned off in response to the store-item confidence level indicating a lack of confidence in the detected item count value calculated based on the RFID tag data, wherein the selected item in ineligible for automatic downward adjustment of current on-hand inventory item count values when the PISOS indicator is turned off.

7. A computer-implemented method comprising:
   generating, by an analysis component, detected item count values associated with a first set of items in a plurality of items based on RFID tag data obtained from a plurality of RFID tags associated with the plurality of items, wherein the plurality of items is associated with a modular display;
   calculating a confidence score, wherein the confidence score is based on at least a location of the plurality of items;
   comparing the confidence score against a confidence threshold value and in response to the confidence score equaling or exceeding the confidence threshold value, apply a set of product in-scope out-of-scope (PISOS)

rules, via a PISOS manager, to the plurality of items; the set of PISOS rules comprising:
  determining whether the detected item count values associated with the first set of items is lower than a current on-hand inventory count values associated with the first set of items;
  rejecting downward adjustment of the current on-hand inventory count values for a first sub-set of items within the first set of items identified as out-of-scope;
  sending the detected item count values associated with a second sub-set of items within the first set of items for downward adjustment of the current on-hand inventory count values of the second sub-set of items. wherein the second sub-set of items is in-scope for the downward adjustment of the current on-hand inventory count values based on the application of the set of PISOS rules; and
  adjust, automatically, the current on-hand inventory count values associated with a second set of items in the plurality of items upward based on detected item count values in response to:
    a first condition where the detected item count values associated with the second set of items exceeds the current on-hand inventory count values associated with the second set of items, and
    a second condition where a capacity value associated with the modular display is equal to or greater than the detected item count values associated with the second set of items.

8. The computer-implemented method of claim 7, further comprising:
  comparing the detected item count value associated with a selected item to an expected item count value associated with the selected item, wherein a scan for instances of the selected item is complete if a difference between the detected item count value and the expected item count value is within a store-item threshold range.

9. The computer-implemented method of claim 7, further comprising:
  checking, by an eligibility component, a set of indicators associated with a selected item indicating whether the selected item is eligible for automatic downward inventory adjustment using the RFID tag data based on a set of product in-scope out-of-scope (PISOS) rules, wherein the set of indicators comprises an RFID eligibility indicator indicating whether instances of the selected item are expected to be RFID tagged.

10. The computer-implemented method of claim 7, further comprising:
  checking a set of indicators associated with a selected item indicating whether the selected item is eligible for automatic downward inventory adjustment using the RFID tag data based on a set of product in-scope out-of-scope (PISOS) rules, wherein the set of indicators comprises a PISOS indicator indicating whether downward adjustment of a current on-hand inventory item count value associated with instances of the selected item is permitted based on compliance with the set of PISOS rules.

11. The computer-implemented method of claim 7, further comprising:
  verifying the detected item count value represents instances of a selected item located within an item display area accessible to users, wherein the detected item count values associated with items within an item storage area are rejected for downward on-hand inventory adjustments.

12. The computer-implemented method of claim 7, further comprising:
  switching a PISOS indicator for a selected item to an off position in response to a store-item confidence level indicating a lack of confidence in the detected item count value calculated for the selected item based on the RFID tag data, wherein the selected item in ineligible for automatic downward adjustment of inventory item count values when the PISOS indicator is turned off.

13. One or more non-transitory computer storage media having computer-executable instructions that, when executed by a processor, cause the processor to:
  obtain radio frequency identification (RFID) tag data from a plurality of items from at least one RFID tag reader to determine an item count value, wherein the plurality of items is associated with a modular display;
  calculate a confidence score, wherein the confidence score is based on at least a location of the plurality of items;
  compare the confidence score against a confidence threshold value and in response to the confidence score meeting or exceeding the confidence threshold value, apply a set of product in- scope out-of-scope (PISOS) rules, via a PISOS manager, to the plurality of items; the set of PISOS rules comprising:
    determine a first set of items within the plurality of items having detected item count values lower than a current on-hand inventory count values;
    reject a downward adjustment of the current on-hand inventory count values for a first sub-set of items within the first set of items identified as out-of-scope based on application of the set of PISOS;
    send the detected item count values associated with a second sub-set of items within the first set of items to an inventory system for downward adjustment of the current on-hand inventory count values of the second sub-set of items, wherein the second sub-set of items is in-scope for the downward adjustment of the current on-hand inventory count values based on the application of the set of PISOS rules; and
    adjust, automatically, the current on-hand inventory count values associated with a second set of items in the plurality of items upward based on detected item count values in response to:
      a first condition where the detected item count values associated with the second set of items exceeds the current on-hand inventory count values associated with the second set of items, and
      a second condition where a capacity value associated with the modular display is equal to or greater than the detected item count values associated with the second set of items.

14. The one or more non-transitory computer storage media having computer-executable instructions of claim 13, that when executed by a processor, further cause the processor to:
  comparing the detected item count value associated with a selected item to an expected item count value associated with the selected item, wherein a scan for instances of the selected item is complete if a difference between the detected item count value and the expected item count value is within a store-item threshold range.

15. The one or more non-transitory computer storage media having computer-executable instructions of claim 13, that when executed by a processor, further cause the processor to:

checking, by an eligibility component, a set of indicators associated with a selected item indicating whether the selected item is eligible for automatic downward inventory adjustment using the RFID tag data based on a set of product in-scope out-of-scope (PISOS) rules, wherein the set of indicators comprises an RFID eligibility indicator indicating whether instances of the selected item are expected to be RFID tagged.

16. The one or more non-transitory computer storage media having computer-executable instructions of claim 13, that when executed by a processor, further cause the processor to:

checking a set of indicators associated with a selected item indicating whether the selected item is eligible for automatic downward inventory adjustment using the RFID tag data based on a set of PISOS rules, wherein the set of indicators comprises a PISOS indicator indicating whether downward adjustment of a current on-hand inventory item count value associated with instances of the selected item is permitted based on compliance with the set of PISOS rules.

17. The one or more non-transitory computer storage media having computer-executable instructions of claim 13, that when executed by a processor, further cause the processor to:

verifying the detected item count value represents instances of a selected item located within an item display area accessible to users, wherein detected item count values associated with items within an item storage area are rejected for downward on-hand inventory adjustments.

* * * * *